US012589605B2

(12) United States Patent
Aoyagi et al.

(10) Patent No.: US 12,589,605 B2
(45) Date of Patent: Mar. 31, 2026

(54) RECORDING DEVICE AND RECORDING METHOD

(71) Applicant: SEIKO EPSON CORPORATION, Tokyo (JP)

(72) Inventors: Shunichi Aoyagi, Shiojiri (JP); Tetsuya Matsumura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 200 days.

(21) Appl. No.: 18/355,523

(22) Filed: Jul. 20, 2023

(65) Prior Publication Data

US 2024/0025193 A1 Jan. 25, 2024

(30) Foreign Application Priority Data

Jul. 22, 2022 (JP) ................................ 2022-117168

(51) Int. Cl.
*B41J 29/393* (2006.01)
*B41J 2/145* (2006.01)
*B41J 25/00* (2006.01)

(52) U.S. Cl.
CPC ............ *B41J 29/393* (2013.01); *B41J 2/145* (2013.01); *B41J 25/001* (2013.01); *B41J 2029/3935* (2013.01)

(58) Field of Classification Search
CPC ........ B41J 29/393; B41J 2/145; B41J 25/001; B41J 2029/3935
See application file for complete search history.

(56) References Cited

U.S. PATENT DOCUMENTS

2006/0197785 A1 9/2006 Uchida
2010/0309240 A1* 12/2010 Tomida ................. B41J 29/393 347/12
2020/0276811 A1* 9/2020 Yokota .................. B41J 2/2135

FOREIGN PATENT DOCUMENTS

JP 2006-272957 A 10/2006

* cited by examiner

*Primary Examiner* — Jason S Uhlenhake
(74) *Attorney, Agent, or Firm* — Spencer Fane LLP

(57) ABSTRACT

A recording device, when n is an integer of 3 or more, controls a recording head to record n test patters from which a shift amount is acquirable between a scan and a scan different from each other on a medium in a main scanning direction, at least three test pattern is formed by a plurality of patches recorded by a plurality of scans, the n test patterns are formed so as to be different from each other in positional relationship of the plurality of patches and recorded side by side in the main scanning direction in an order different from an order in which the positional relationship of the plurality of patches gradually changes.

12 Claims, 8 Drawing Sheets

RECORDING DEVICE AND RECORDING METHOD

The present application is based on, and claims priority from JP Application Serial Number 2022-117168, filed Jul. 22, 2022, the disclosure of which is hereby incorporated by reference herein in its entirety.

BACKGROUND

1. Technical Field

The present disclosure relates to a recording device and a recording method.

2. Related Art

There is disclosed a technique for adjusting a transport amount of a medium in a sub scanning direction so as to eliminate an error between a dot landing position on the medium by a previous scan by a recording head and a dot landing position on the medium by a subsequent scan following the transport of the medium.

As the related art, a recording device is disclosed that includes a first recording device for recording a plurality of reference patterns on a recording medium in a main scanning direction, a second recording device that records a plurality of adjustment patterns in the main scanning direction after transport of the recording medium by a sub scanning unit and that uses a nozzle corresponding to a region in which the reference pattern is recorded or a nozzle near the above nozzle, makes a nozzle or a combination of nozzles used for recording each of the plurality of adjustment patterns different, and records the plurality of adjustment patterns that are gradually and positionally shifted in a sub scanning direction with respect to the reference pattern, and a calculation device that calculates a transport amount of the recording medium transported by the sub scanning unit based on a density difference of a plurality of patterns formed by a first pattern and a second pattern (see JP 2006-272957 A).

When an error occurs in anything other than the transport amount of an adjustment target between a process of recording a pattern by a previous scan and a process of recording a pattern by a subsequent scan, the transport amount cannot be accurately grasped from a recording result of the pattern and appropriate adjustment cannot be performed. In particular, skew in which the medium is inclined with respect to a transport direction may occur between a previous scan and a subsequent scan. When the skew of the medium occurs, the plurality of patterns by the first and second patterns in JP 2006-272957 A are different in degree of influence of the skew depending on a position of each pattern, thus it is difficult to appropriately calculate the transport amount of the recording medium by evaluating a recording result of the plurality of patterns. Note that the error that occurs in anything other than the adjustment target between the recording by the previous scan and the recording by the subsequent scan is not limited to the skew of the medium.

In view of such a situation, improvement is required for, even when an error occurs in anything other than an adjustment target between recording by a previous scan and recording by a subsequent scan, removing influence of the error as much as possible and correctly acquiring necessary information from a result of recording by a plurality of scans.

SUMMARY

A recording device including a recording head including a plurality of nozzles for discharging liquid onto a medium and a control unit for controlling the recording head, and the recording device being configured to perform recording on the medium by a scan for causing the recording head to discharge the liquid while moving the recording head along a predetermined main scanning direction, wherein the control unit controls the recording head to record n test patterns from which a shift amount between the scan and the scan different from each other is acquirable on the medium in the main scanning direction, where n is an integer of 3 or more, at least three of the test patterns is formed by a plurality of patches recorded by a plurality of the scans, and the n test patterns are formed so as to be different from each other in positional relationship of the plurality of patches and recorded side by side in the main scanning direction in an order different from an order in which the positional relationship of the plurality of patches gradually changes.

A recording method of performing recording on a medium by a scan for causing a recording head to discharge liquid while moving, along a predetermined main scanning direction, the recording head, the recording head including a plurality of nozzles for discharging the liquid onto the medium, the recording method including a recording control step for controlling the recording head to record n test patterns from which a shift amount between the scan and the scan different from each other is acquirable on the medium in the main scanning direction, where n is an integer of 3 or more, and in the recording control step, at least three of the test patterns is formed by a plurality of patches recorded by a plurality of the scans, and the n test patterns are formed so as to be different from each other in positional relationship of the plurality of patches and recorded side by side in the main scanning direction in an order different from an order in which the positional relationship of the plurality of patches gradually changes.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions, shapes and shading are not precise, do not match each other, or are partially omitted in some cases.

1. Schematic Description of Device Configuration

Figure 1:
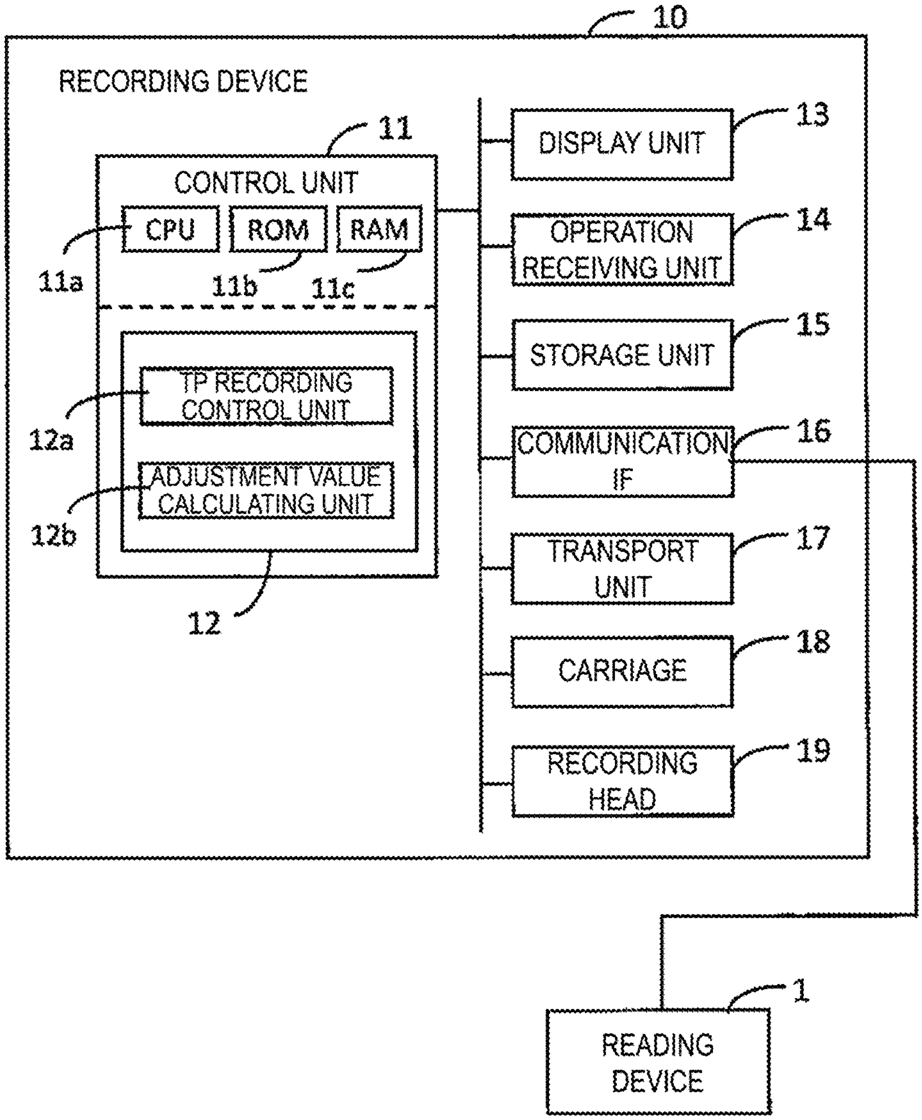
FIG. 1 is a block diagram illustrating a device configuration of the present embodiment in a simplified manner.

FIG. 1 illustrates a configuration of a recording device 10 according to the present embodiment, in a simplified manner. A recording method is performed by the recording device 10.

The recording device 10 includes a control unit 11, a display unit 13, an operation receiving unit 14, a storage unit 15, a communication IF 16, a transport unit 17, a carriage 18, a recording head 19 and the like. IF is an abbreviation for interface. The control unit 11 is configured to include, as a processor, one or more ICs including a CPU 11*a*, a ROM 11*b*, a RAM 11*c*, and the like, another non-volatile memory, and the like.

In the control unit 11, the processor, that is, the CPU 11*a* executes arithmetic processing in accordance with a program 12 stored in the ROM 11*b*, the other memory, or the like, using the RAM 11*c* or the like as a work area, to realize various functions such as a TP recording control unit 12*a* and an adjustment value calculating unit 12*b*. TP is an abbreviation for test pattern. The program 12 corresponds to a recording control program. The TP recording control unit 12*a* and the adjustment value calculating unit 12*b* are only some of the functions realized by the recording device 10 according to the program 12. The processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display, and a drive circuit for driving the display.

The operation receiving unit 14 is a device for receiving an operation or input by a user, and is realized, for example, by a physical button, a touch panel, a mouse, a keyboard, or the like. The display unit 13 and the operation receiving unit 14 may be collectively referred to as an operating panel of the recording device 10. The operation receiving unit 14 as the touch panel is realized as a function of the display unit 13. Therefore, it may be understood that the display unit 13 is configured to include the operation receiving unit 14.

The storage unit 15 is, for example, also a hard disk drive, a solid-state drive or another storage device using a memory. A part of the memory included in the control unit 11 may be regarded as the storage unit 15. The storage unit 15 may be regarded as a part of the control unit 11.

The communication IF 16 is a generic term for one or a plurality of IFs for the recording device 10 to perform communication with an external device in a wired or wireless manner, in accordance with a prescribed communication protocol including a known communication standard. The communication IF 16 corresponds to a communication unit. The external device is, for example, a communication device such as a personal computer (PC), a server, a smart phone or a tablet-type terminal. In the example of FIG. 1, the recording device 10 is coupled to a reading device 1 via the communication IF 16. The number of external devices to which the recording device 10 is communicably coupled is not limited to one. The reading device 1 is a device capable of reading a medium 30 after recording by the recording device 10 and is a scanner or a colorimeter. The reading device 1 may be a part of the recording device 10.

The transport unit 17 is a device for transporting the medium 30 along a predetermined transport path under the control of the control unit 11. The transport unit 17 includes, for example, a roller that rotates to transport the medium 30, a motor as a power source of rotation, and the like. In addition, the transport unit 17 may be a mechanism in which the medium 30 is mounted on a drum, a belt or a pallet that is driven by a motor, for transporting the medium 30. The medium 30 is, for example, paper, but may be any medium that can be a target of recording with liquid, and may be a material other than paper, such as film or fabric.

The carriage 18 is a moving device that reciprocates along a predetermined main scanning direction by power of a carriage motor (not illustrated) under the control of the control unit 11. The carriage 18 is mounted with the recording head 19.

The recording head 19 is a device that performs recording by discharging liquid onto the medium 30 by an ink jet method under the control of the control unit 11. A liquid droplet discharged by the recording head 19 is referred to as a dot. The liquid is mainly ink.

The recording head 19 is capable of discharging colors of ink, such as cyan (C), magenta (M), yellow (Y) and black (K), for example. Of course, the recording head 19 may be capable of discharging ink of a color other than CMYK or liquid other than ink. The movement of the carriage 18 is synonymous with movement of the recording head 19. The carriage 18 and the recording head 19 may be collectively regarded as a recording head or may be referred to as a recording unit.

The recording device 10 is a single printer in which configurations thereof are integrated.

Alternatively, the recording device 10 may be a recording system realized by communicably coupling a plurality of devices or apparatuses. The recording system includes, for example, an information processing device that mainly serves as the control unit 11, and a printer that includes the transport unit 17, the carriage 18 and the recording head 19 and performs recording under the control of the information processing device. In this case, the information processing device can be grasped as a recording control device, an image processing device or the like. The display unit 13, the operation receiving unit 14 or the storage unit 15 may be a part of the information processing device or the printer or may be a peripheral device coupled to the information processing device or the printer.

Figure 2:
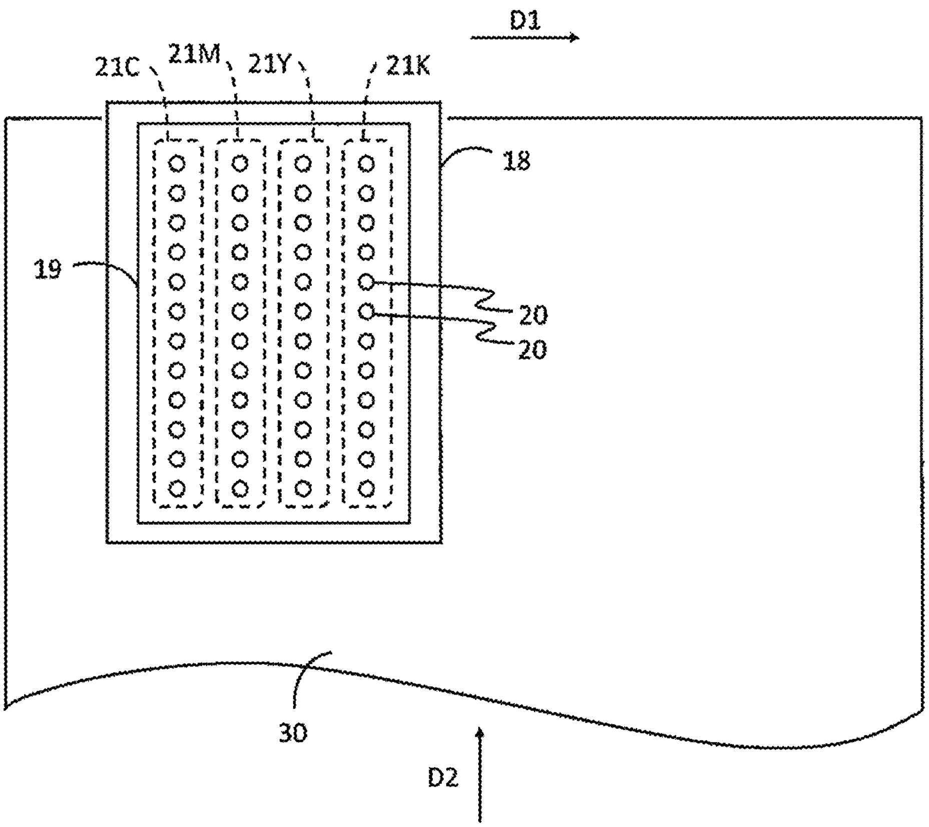
FIG. 2 is a diagram illustrating relationship between a recording head and a medium in a simplified manner, as seen from above.

FIG. 2 illustrates relationship between the recording head 19 and the medium 30 in a simplified manner, as seen from above. The recording head 19 includes a plurality of nozzles 20 that can discharge liquid. Each white circle illustrated in FIG. 2 is the individual nozzle 20. A main scanning direction D1 and a sub scanning direction D2 intersect each other. The term "intersect" as used herein refers to being orthogonal or substantially orthogonal. The direction D2 intersecting the main scanning direction D1 is also referred to as a transport direction D2.

The recording head 19 includes a nozzle group for each liquid type. In FIG. 2, nozzle groups 21C, 21M, 21Y and 21K are very simply illustrated as the nozzle groups. In each of the nozzle groups 21C, 21M, 21Y and 21K, a plurality of the nozzles 20 having a constant or substantially constant nozzle pitch, which is an interval between the nozzles 20 in the sub scanning direction D2, are aligned. As indicated by an arrow in the sub scanning direction D2, the transport unit 17 transports the medium 30 from upstream to downstream in the sub scanning direction D2. Upstream and downstream of the sub scanning direction D2, that is, the transport direction D2 are simply referred to as upstream and downstream.

The nozzle group 21C is a nozzle group in which a plurality of the nozzles 20 that discharge a C ink are aligned. Similarly, the nozzle group 21M is a nozzle group in which a plurality of the nozzles 20 that discharge an M ink are aligned, the nozzle group 21Y is a nozzle group in which a plurality of the nozzles 20 that discharge a Y ink are aligned, and the nozzle group 21K is a nozzle group in which a plurality of the nozzles 20 that discharge a K ink are aligned. The plurality of nozzle groups 21C, 21M, 21Y and 21K are aligned along the main scanning direction D1, and positions thereof are the same in the sub scanning direction D2. In FIG. 2, a nozzle alignment direction in which the plurality of nozzles 20 constituting the same nozzle group are aligned is parallel to the sub scanning direction D2, but the nozzle alignment direction may obliquely intersect the sub scanning direction D2. A length of a nozzle group in the sub scanning direction D2 is referred to as a nozzle group length.

The control unit 11 causes the recording head 19 to discharge ink based on recorded data representing an image to be recorded. As is known, in the recording head 19, a driving element is provided for each nozzle 20, and when application of a driving signal to the driving element of each nozzle 20 is controlled in accordance with the recorded data, each nozzle 20 does or does not discharge a dot of corresponding ink, and the image represented by the recorded data is recorded on the medium 30. The recorded data is data that defines dot discharge or dot non-discharge for each pixel and for each of ink colors such as CMYK. A discharge of a dot is also referred to as dot-on, and non-discharge of a dot is also referred to as dot-off.

An ink discharge by the recording head 9 along with movement of the recording head 19 along the main scanning direction D1 by the carriage 18 is referred to as a "scan" or a "pass". Further, downstream transport by a predetermined distance performed by the transport unit 17 between a pass and a pass is referred to as "paper feeding". The control unit 11 records a two dimensional image on the medium 30 by alternately repeating a pass and paper feeding.

Movement from one side to another side along the main scanning direction D1 is referred to as forward movement, and movement from the other side to the one side is referred to as backward movement. Further, a pass by forward movement is referred to as a forward pass, and a pass by backward movement is referred to as a backward pass. Recording by a forward pass and a backward pass is bidirectional recording, and recording by only one of a forward pass and a backward pass is unidirectional recording. Although the bidirectional recording is basically employed in the present embodiment, the unidirectional recording may also be employed.

The carriage 18 may be a moving device capable of performing, together with the recording head 19, not only reciprocating along the main scanning direction D1 but also reciprocating along the sub scanning direction D2. That is, the recording head 19 may record a two dimensional image on the medium 30 by moving upstream by a predetermined distance instead of paper feeding between a pass and a pass. In this case, the transport unit 17 transports the medium 30 not along the sub scanning direction D2 but along the main scanning direction D1. That is, the transport unit 17 may intermittently transport the medium 30 along the main scanning direction D1, and the recording head 19 may move, to record an image, along the main scanning direction D1 or the sub scanning direction D2 with respect to the medium 30 that is temporarily stopped.

The recording method described with reference to FIG. 2 in which the recording head 19 performs a pass while moving in the main scanning direction D1 and the medium 30 is fed in the sub scanning direction D2 between a pass and a pass is referred to as a serial method. On the other hand, a recording method in which the recording head 19 performs a pass while moving along the main scanning direction D1 and moves along the sub scanning direction D2 instead of performing paper feeding between a pass and a pass is referred to as a lateral method. Hereinafter, the description will be continued on the assumption of the serial method, but the description may be naturally interpreted by replacing the serial method with the lateral method.

2. Description of Problem

Figure 3:
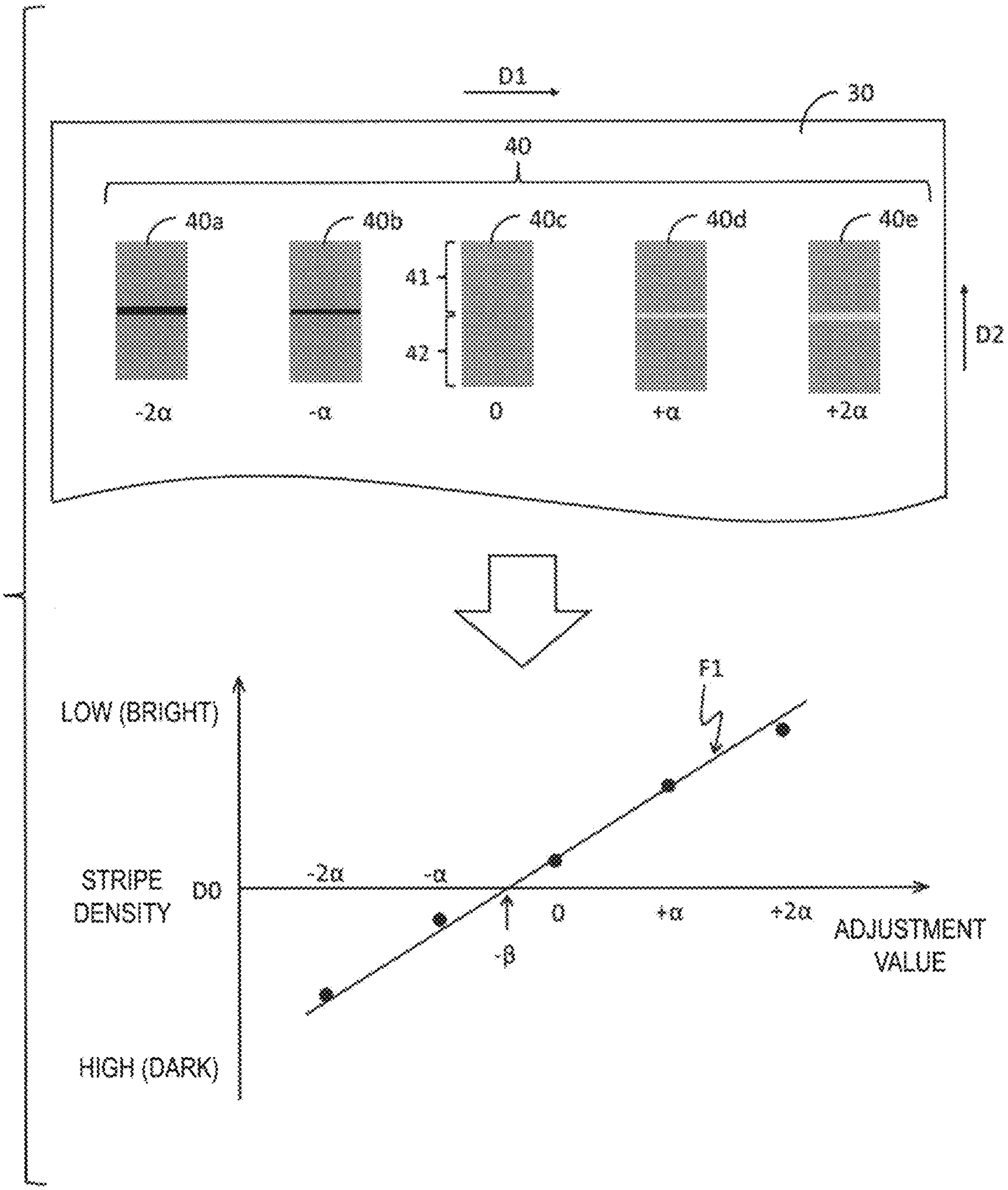
FIG. 3 is a diagram for explaining TP group recording and adjustment value acquisition of the related art on the assumption that there is no skew.
Figure 4:
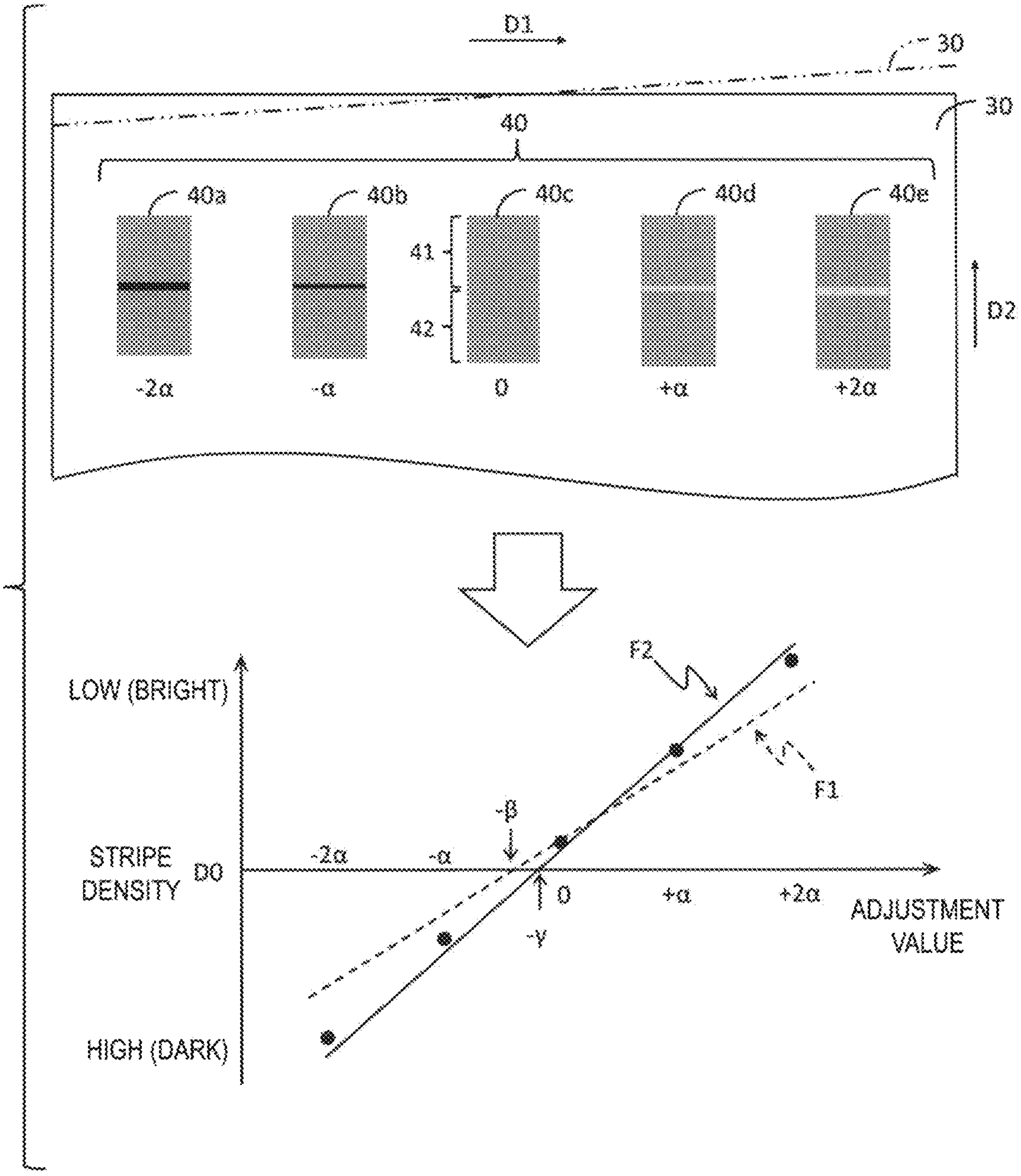
FIG. 4 is a diagram for explaining the TP group recording and the adjustment value acquisition of the related art on the assumption that there is skew.

With reference to FIGS. 3 and 4, problems assumed by the present embodiment will be specifically described. FIG. 3 and FIG. 4 correspond to an example of the related art. A part of the medium 30 on which a TP group 40 is recorded by a printer is illustrated at an upper stage in FIG. 3. The TP group 40 includes n TPs 40*a*, 40*b*, 40*c*, 40*d* and 40*e*. In the present embodiment, n is an integer of 3 or more. In the example of FIG. 3, n=5. As can be seen from FIG. 3, the TPs 40*a*, 40*b*, 40*c*, 40*d* and 40*e* of the TP group 40 are recorded side by side along the main scanning direction D1. Further, each of the TPs 40*a*, 40*b*, 40*c*, 40*d* and 40*e* is formed by a downstream first patch 41 and an upstream second patch 42. In FIG. 3, for the TPs 40*a*, 40*b*, 40*d* and 40*e* other than the TP 40*c*, description of reference numerals 41 and 42 is omitted. The first patch 41 and the second patch 42 have the same or substantially the same shape. Hereinafter, right and left with respect to a viewpoint directed from upstream to downstream are simply referred to as right and left.

A plurality of the patches 41 and 42 forming one TP are recorded by different passes, respectively. That is, each of the TPs 40*a*, 40*b*, 40*c*, 40*d* and 40*e* is recorded by two passes. Further, the TPs 40*a*, 40*b*, 40*c*, 40*d* and 40*e* are formed so as to be different from each other in positional relationship of the first patch 41 and the second patch 42. $-2\alpha$, $-\alpha$, 0, $+\alpha$ and $+2\alpha$ illustrated in FIG. 3 are position adjustment values for the first patch 41 and the second patch 42 with respect to the TPs 40*a*, 40*b*, 40*c*, 40*d* and 40*e*, respectively. $\alpha$ is a numerical value meaning a predetermined distance.

The position adjustment value for the TP 40*c* located at a center, among the TPs 40*a*, 40*b*, 40*c*, 40*d* and 40*e*, is 0, which means that positions of the first patch 41 and the second patch 42 are not adjusted. That is, in the TP 40*c* in which the positions of the first patch 41 and the second patch 42 are not adjusted, after a pass for recording the first patch 41, through paper feeding according to an instruction of a "reference feeding amount" which is a predetermined one time paper feeding amount, the second patch 42 is recorded by a subsequent pass.

In order to simplify the description, it is assumed that a length of the first patch 41 or the second patch 42 in the sub scanning direction D2 corresponds to a nozzle group length. In other words, each of the first patch 41 and the second patch 42 is a band image recorded by one pass of the recording head 19. The reference feeding amount is a distance smaller than the nozzle group length by a length corresponding to a predetermined number of nozzles. Therefore, after the recording head 19 records the first patch 41 by one pass, the transport unit 17 performs paper feeding by the reference feeding amount once and the recording head 19 records the second patch 42 by a subsequent pass, then an upstream end portion of the first patch 41 and a downstream end portion of the second patch 42 slightly overlap as long as there is no error in the paper feeding. The reference feeding amount is set to the distance smaller than the nozzle group length by the length corresponding to the predetermined number of nozzles so that no gaps occur in the sub scanning direction D2 between the images recorded by the respective successive passes.

When an amount of an overlapping portion in which the upstream end portion of the first patch 41 and the downstream end portion of the second patch 42 overlap each other is increased more than necessary, density of the overlapping portion is increased and the overlapping portion is likely to be visually recognized as dark stripe-like irregularity. On the other hand, between the first patch 41 and the second patch 42, when the amount of the overlapping portion is too small, or there is no overlapping portion and a gap is generated, density between the first patch 41 and the second patch 42 is decreased, and bright stripe-like irregularity is likely to be visually recognized. In the following, stripe-like irregularity darker than a color of a patch is referred to as a "black stripe", and stripe-like irregularity brighter than a color of a patch is referred to as a "white stripe".

In FIG. 3, the position adjustment value for the TP 40*b* recorded left from the TP 40*c* is −α. This means that after a pass for recording the first patch 41, through paper feeding according to an instruction of a "reference feeding amount −α", the second patch 42 is recorded by a subsequent pass and the TP 40*b* is formed. That is, since a distance between the first patch 41 and the second patch 42 in the TP 40*b* in the sub scanning direction D2 is smaller than that in the TP 40*c* by α, an overlapping portion increases and a black stripe is more likely to occur as compared with the TP 40*c*. The position adjustment value for the TP 40*a* recorded left from the TP 40*b* is −2α. This means that after a pass for recording the first patch 41, through paper feeding according to an instruction of a "reference feeding amount −2α", the second patch 42 is recorded by a subsequent pass and the TP 40*a* is formed. Therefore, a distance between the first patch 41 and the second patch 42 in the sub scanning direction D2 is smaller in the TP 40*a* than in the TP 40*b*.

In FIG. 3, the position adjustment value for the TP 40*d* recorded right from the TP 40*c* is +α. This means that after a pass for recording the first patch 41, through paper feeding according to an instruction of a "reference feeding amount +α", the second patch 42 is recorded by a subsequent pass and the TP 40*d* is formed. Since a distance between the first patch 41 and the second patch 42 in the TP 40*d* in the sub scanning direction D2 is larger than that in the TP 40*c* by α, an overlapping portion decreases and a white stripe is more likely to occur as compared with the TP 40*c*. The position adjustment value for the TP 40*e* recorded right from the TP 40*d* is +2α. This means that after a pass for recording the first patch 41, through paper feeding according to an instruction of a "reference feeding amount +2α", the second patch 42 is recorded by a subsequent pass and the TP 40*e* is formed. Therefore, a distance between the first patch 41 and the second patch 42 in the sub scanning direction D2 is larger in the TP 40*e* than in the TP 40*d*.

In the TPs 40*a*, 40*b*, 40*c*, 40*d* and 40*e*, the positional relationship of the first patch 41 and the second patch 42 gradually changes according to an alignment order thereof in the main scanning direction D1. As described above, in the TP group 40 of the related art, the n TPs 40*a*, 40*b*, 40*c*, 40*d* and 40*e* are recorded on the medium 30, side by side in the main scanning direction D1 in the order in which the positional relationship of the patches 41 and 42 gradually changes.

FIG. 3 illustrates the example in which no black stripe or white stripe occurs in the TP 40*c*, a black stripe occurs in each of the TP 40*a* and 40*b* on a left side of the TP 40*c*, and a white stripe occurs in each of the TP 40*d* and TP 40*e* on a right side of the TP 40*c*. Further, the black stripe of the TP 40*a* at a left end has higher density than that of the black stripe of the TP 40*b*, and the white stripe of the TP 40*e* at a right end has lower density than that of the white stripe of the TP 40*d*. However, transport accuracy of the medium 30 differs for each individual printer. Therefore, even in the TP 40*c* having the position adjustment value of 0, when an error occurs in paper feeding, it is naturally conceivable that a black stripe or a white stripe occurs in a recording result thereof. Further, depending on transport accuracy, for example, there may be a case where a white stripe occurs in the TP 40*c* and almost no white stripe or black stripe occurs in the TP 40*b*, or conversely, there may be a case where a black stripe occurs in the TP 40*c* and almost no white stripe or black stripe occurs in the TP 40*d*.

A lower stage in FIG. 3 shows stripe density obtained from a reading result of the TP group 40 recorded on the medium 30. According to the lower stage in FIG. 3, on a graph in which a vertical axis represents stripe density and a horizontal axis represents position adjustment value, stripe density for each of the position adjustment values −2, −α, 0, +α and +2α, that is, for each of the TPs 40*a*, 40*b*, 40*c*, 40*d* and 40*e*, is plotted with a black circle. The stripe density is brightness of a boundary between the first patch 41 and the second patch 42 for each TP. The stripe density may be understood as a difference between density of the patch and density of the boundary on the medium 30. Stripe density D0 is an ideal value of stripe density and indicates a state in which there is no difference from density of a patch, that is, a state in which neither a black stripe nor a white stripe is substantially visible. In the graph, stripe density below the stripe density D0, that is, stripe density on a high-density side corresponds to a black stripe, and a stripe density above the stripe density D0, that is, on a low-density side corresponds to a white stripe. It can be said that such stripe density represents a shift amount between the first patch 41 and the second patch 42 in the sub scanning direction D2. Therefore, each of the TPs 40*a*, 40*b*, 40*c*, 40*d* and 40*e* corresponds to a test pattern from which a shift amount between different scans is acquirable.

After acquiring the stripe density for each of the TPs 40*a*, 40*b*, 40*c*, 40*d* and 40*e*, the processor calculates an approximate straight line of the stripe density. In the lower stage in FIG. 3, an approximate straight line F1 is calculated by a least-square method from the stripe density of each of the TPs 40*a*, 40*b*, 40*c*, 40*d* and 40*e*. The processor obtains −β in FIG. 3 as a position adjustment value when the approximate straight line F1 gives the stripe density D0. Thereafter, in recording by the printer, the processor adopts the position adjustment value −β and instructs a "reference feeding amount −β" to the transport unit as a one-time paper feeding amount. As a result, it is possible to obtain good recording image quality in which a black stripe or a white stripe does not occur at a joint of band images recorded on the medium 30 by respective passes.

However, the description related to FIG. 3 is a description assuming that skew of the medium 30 does not occur in paper feeding between a pass for recording the first patch 41 and a pass for recording the second patch 42.

Similar to FIG. 3, FIG. 4 illustrates the medium 30 on which the TP group 40 in which the TPs 40*a*, 40*b*, 40*c*, 40*d* and 40*e* are aligned is recorded at an upper stage in the figure and shows, at a lower stage in the figure, stripe density for each of position adjustment values −2α, −α, 0, +α and +2α obtained from a reading result of the TPs 40*a*, 40*b*, 40*c*, 40*d* and 40*e*. A way of viewing FIG. 4 is the same as that of FIG. 3.

In a lower stage in FIG. 4, an approximate straight line F2 is shown that the processor, after acquiring the stripe density for each of the TPs 40*a*, 40*b*, 40*c*, 40*d* and 40*e*, calculated from the stripe density by the least-square method. In addition, in the lower stage in FIG. 4, the approximate straight line F1 shown in FIG. 3 is indicated by a broken line for reference. Further, an upper stage in FIG. 4 illustrates occurrence of skew in the medium 30 during paper feeding between a pass for recording the first patch 41 and a pass for recording the second patch 42 in a simplified manner by a two dot chain line. The two dot chain line indicates a direction of an end portion of the medium 30 facing downstream.

When such skew occurs, in the TP 40*a* and the TP 40*b* recorded on a left side of the medium 30 among the TPs 40*a*, 40*b*, 40*c*, 40*d* and 40*e*, a distance between positions of the first patch 41 and the second patch 42 in the sub scanning direction D2 decreases so as to be less than a distance corresponding to the feeding amount adjusted with −2α or −α as described above. On the other hand, in the TP 40*d* and the TP 40*e* recorded on a right side of the medium 30, a distance between positions of the first patch 41 and the second patch 42 in the sub scanning direction D2 increases so as to be further greater than a distance corresponding to the feeding amount adjusted with +α or +2α as described above. Further, the TP 40*a* on a left end and the TP 40*e* on a right end are more strongly affected by the skew.

As a result, the stripe density for each of the TPs 40*a*, 40*b*, 40*c*, 40*d* and 40*e* is affected by the skew per position of the TP and has a value different from that when there is no skew, and as shown in the lower stage in FIG. 4, the approximate straight line F2 different from the approximate straight line F1 is calculated. Therefore, a position adjustment value −γ that gives the stripe density D0 obtained from the approximate straight line F2 is also different from the above-described position adjustment value −β. That is, in the related art, a position adjustment value obtained from the approximate straight line is different between a case where skew occurs in the medium 30 and a case where skew does not occur in the medium 30. Since the position adjustment value −γ obtained when the skew occurs in the medium 30 is affected by the skew, it is not possible to appropriately adjust a paper feeding amount which is an original adjustment target in subsequent recording.

3. From Recording of TP Group to Adjustment Value Acquisition

Figure 5:
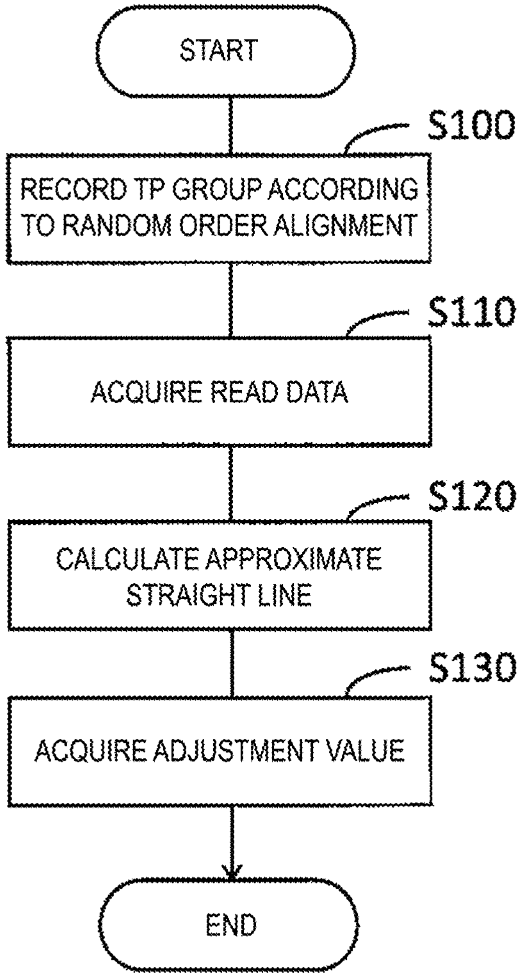
FIG. 5 is a flowchart illustrating processing performed by a control unit of the present embodiment.

FIG. 5 illustrates, using a flowchart, processing performed by the control unit 11 in accordance with the program 12, from recording of a TP group to acquisition of an adjustment value. Step S100 in the flowchart corresponds to the recording method of the present embodiment.

Figure 6:
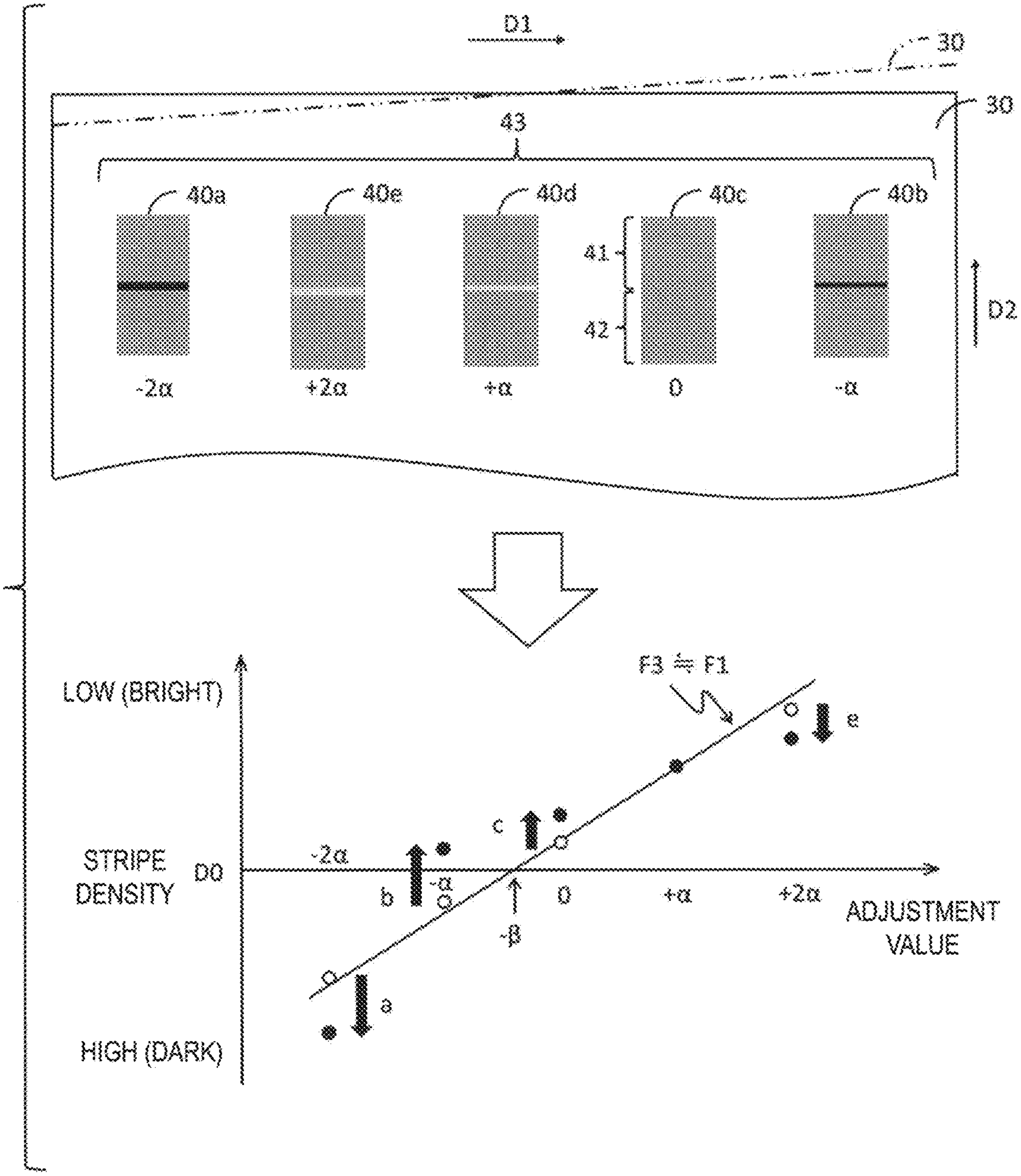
FIG. 6 is a diagram for explaining TP group recording and adjustment value acquisition using random order alignment.

Similar to FIGS. 3 and 4, FIG. 6 illustrates the medium 30 on which a TP group 43 formed by the n TPs 40*a*, 40*b*, 40*c*, 40*d* and 40*e* is recorded at an upper stage in the figure and shows stripe density for each of position adjustment values −2α, −α, 0, +α and +2α obtained from a reading result of the TPs 40*a*, 40*b*, 40*c*, 40*d* and 40*e* at a lower stage in the figure. A way of viewing FIG. 6 is the same as that of FIGS. 3 and 4. In the description of FIGS. 5 and 6, the description common to that of FIGS. 3 and 4 will be omitted as appropriate.

In step S100, the TP recording control unit 12*a* of the control unit 11 starts controlling the transport unit 17, the carriage 18 and the recording head 19 and causes the recording head 19 to discharge ink based on recorded data representing the TP group 43 to record the TP group 43 on the medium 30. According to FIG. 6, in the TP group 43, the TPs 40*a*, 40*e*, 40*d*, 40*c* and 40*b* are aligned in this order from left to right along the main scanning direction D1. As described above, the position adjustment values for the respective TPs 40*a*, 40*e*, 40*d*, and 40*b* are −2α, +2α, +α, 0, and −α, respectively. That is, according to the step S100, the n TPs 40*a*, 40*b*, 40*c*, 40*d* and 40*e* are recorded on the medium 30 so as to be aligned along the main scanning direction D1 in an order different from an "order of the TPs 40*a*, 40*b*, 40*c*, 40*d* and 40*e* for which positional relationship of the patches 41 and 42 gradually changes". Such alignment in the order different from the order for which the positional relationship of the patches 41 and 42 gradually changes is hereinafter referred to as a "random order alignment".

The recording method of the TP group 43 in step S100 will be supplemented.

The control unit 11 controls the recording head 19 to record the first patch 41 corresponding to each of the n TPs 40*a*, 40*e*, 40*d*, 40*c* and 40*b* by a first pass, and to record the second patch 42 corresponding to each of the n TPs 40*a*, 40*e*, 40*d*, 40*c* and 40*d* by a second pass such that a position of the second patch 42 with respect to the first patch 41 is different for each second patch 42. That is, the control unit 11 causes the recording head 19 to record all of the first patches 41 of the respective TPs 40*a*, 40*e*, 40*d*, 40*c* and 40*b* by one pass. Then, the second patch 42 of each of the TPs 40*a*, 40*e*, 40*d*, 40*c* and 40*b* is recorded by the second pass after the pass by which the first patch 41 of each of the TPs 40*a*, 40*e*, 40*d*, 40*c*, and 40*b* is recorded.

The method of recording the second patch 42 of each of the TPs 40*a*, 40*e*, 40*d*, 40*c* and 40*b* can be classified into a first method of recording the second patches 42 by one common pass and a second method of recording the second patches 42 by different passes, respectively. Either the first method or the second method may be employed.

According to the first method, the control unit 11 makes the positional relationship of the patches 41 and 42 different for each TP, by making a range of the nozzles 20 used for recording the patch in the transport direction D2 different for each TP.

Figure 7:
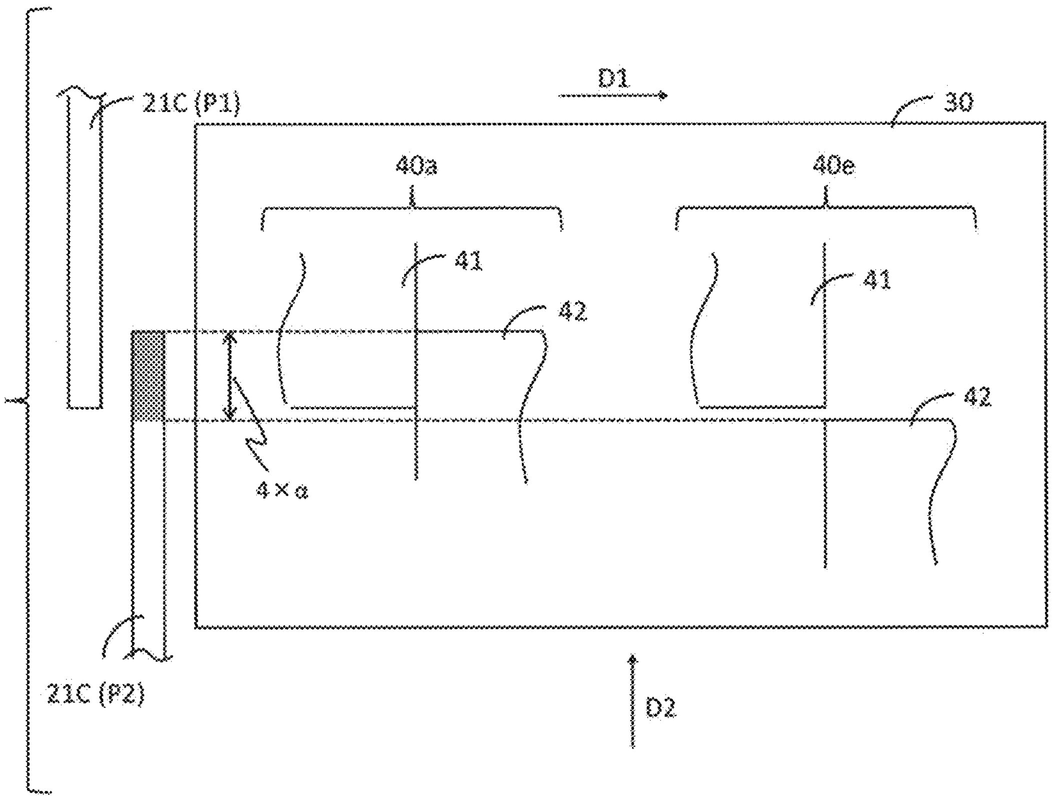
FIG. 7 is a diagram for explaining a specific example of a first method.

FIG. 7 is a diagram for explaining a specific example of the first method and illustrates a part of a nozzle group and the medium 30 in an enlarged manner. In FIG. 7, the nozzle group 21C is illustrated as a nozzle group. Of course, a TP may be recorded with ink other than the C ink. In FIG. 7, the nozzle group 21C is illustrated in a simplified manner by a rectangle elongated in the sub scanning direction D2.

In FIG. 7, for the convenience of space, only the TPs 40*a* and 40*e* among the TPs 40*a*, 40*e*, 40*d*, 40*c* and 40*b* included in the TP group 43 are partially illustrated. In addition, in FIG. 7, for ease of viewing, the first patch 41 and the second patch 42 having relationship of forming one TP are illustrated so as to be shifted from each other in the main scanning direction D1. The first patch 41 and the second patch 42 forming one TP are actually recorded at the same position in the main scanning direction D1.

Symbols P1 and P2 each added in parentheses to the nozzle group 21C mean a first pass P1 and a second pass P2, respectively. That is, between the time when the first pass P1 is performed and the time when the second pass P2 is performed, a relative positional relationship between the nozzle group 21C and the medium 30 in the sub scanning direction D2 changes due to paper feeding between the passes P1 and P2.

The control unit 11 records the first patches 41 of the respective TPs 40*a*, 40*e*, 40*d*, 40*c* and 40*b* in the same manner at intervals along the main scanning direction D1 by the first pass P1 of the recording head 19. For the paper feeding after the first pass P1, a "reference feeding amount −2α" is instructed to the transport unit 17 in accordance with the TP 40*a* of the position adjustment value=−2α that brings the second patch 42 closest to the first patch 41, and the paper feeding by the instructed feeding amount is performed. Then, in the second pass P2 for recording the second patches 42 of the respective TPs 40*a*, 40*e*, 40*d*, 40*c* and 40*b*, it is sufficient that the control unit 11, for the second patch 42 of the TP 40*a*, records the second patch 42 by discharging ink using the entire nozzle group 21C including the most downstream nozzle 20.

On the other hand, for the recording of the second patches 42 of the respective TPs 40*e*, 40*d*, 40*c* and 40*b*, the control unit 11 sets ranges of unused nozzles that are different for the respective TPs 40*e*, 40*d*, 40*c* and 40*b* in a downstream range of the nozzle group 21C including the most downstream nozzle 20 in accordance with the position adjustment value for the respective TPs 40*e*, 40*d*, 40*c* and 40*b*, such as +2α, +α, 0 or −α. Then, in the same second pass P2, it is sufficient to record the second patches 42 for the respective TPs 40*e*, 40*d*, 40*c* and 40*b* by discharging ink using ranges of the used nozzles 20 that are different for the respective TPs 40*e*, 40*d*, 40*c* and 40*b*.

For example, a downstream end of the second patch 42 of the TP 40*e* of the position adjustment value=+2α needs to be shifted upstream from a downstream end of the second patch 42 of the TP 40*a* by a distance corresponding to 4×α. Therefore, during the second pass P2, the control unit 11 sets, in a period in which the second patch 42 of the TP 40*e* is recorded, a range of unused nozzles corresponding to 4×α in the sub scanning direction D2 within a downstream range of the nozzle group 21C including the most downstream nozzle 20. In FIG. 7, the range of unused nozzles in the period in which the second patch 42 of the TP 40*e* is recorded during the second pass P2 is illustrated by being painted in gray. According to such a configuration, it is possible to record each second patch 42 having a different positional relationship with the corresponding first patch 41 in the same second pass P2.

According to the second method, the control unit 11 makes positional relationship of the patches 41 and 42 different for each TP by making a distance of transport that the transport unit 17 performs between a pass and a pass each for recording a patch different for each TP. That is, after the first pass for collectively recording the first patches 41 of the respective TPs 40*a*, 40*e*, 40*d*, 40*c* and 40*b*, the control unit 11 controls the transport unit 17, the carriage 18 and the recording head 19 to repeatedly perform paper feeding, a second pass and back-feeding in order to record the second patches 42 of the respective TPs 40*a*, 40*e*, 40*d*, 40*c* and 40*b*. The back-feeding is transport of the medium 30 from downstream to upstream and is necessary, after a second pass for recording the second patch 42 of one TP, to record the second patch 42 of a subsequent TP. After the first pass, the control unit 11 performs each of the paper feeding and the second pass n times and performs the back-feeding between the second pass and the paper feeding n−1 times. A paper feeding amount for recording the second patch 42 of each of the TPs 40*a*, 40*e*, 40*d*, 40*c* and 40*b* is as described with reference to FIGS. 3 and 4.

A plurality of patches forming a TP may be recorded with liquid of the same color. That is, the control unit 11 records the first patch 41 and the second patch 42 forming one TP with ink of the same color. Referring to FIG. 7, for example, the first patch 41 and the second patch 42 forming the TP 40*a* and the first patch 41 and the second patch 42 forming the TP 40*e* are all recorded with the C ink by the nozzle group 21C.

As can be seen from FIG. 6, the TPs 40*a*, 40*e*, 40*d*, 40*c* and 40*b* of the TP group 43 are arranged at substantially equal intervals in the main scanning direction D1. That is, the control unit 11 may control the recording head 19 to record the n TPs at equal intervals in the main scanning direction D1.

Furthermore, the control unit 11 may control the recording head 19 to record the n TPs in a bilaterally symmetrical arrangement with a center of the medium 30 in the main scanning direction D1 as an axis. In the example of FIG. 6, among the TPs 40*a*, 40*e*, 40*d*, 40*c* and 40*b* of the TP group 43, the central TP 40*d* is arranged substantially at the center in the main scanning direction D1 of the medium 30, and the TPs 40*a* and 40*e* and the TPs 40*c* and 40*b* are arranged substantially symmetrically left and right of the TP 40*d*, respectively.

Furthermore, the control unit 11 may control the recording head 19 to record, in a vicinity of each of the n TPs, information indicating positional relationship of a plurality of patches forming the TP. In the example of FIG. 6, the position adjustment values such as −2α, +2α, +α, 0, and −α each correspond to the information indicating the positional relationship of the plurality of patches. That is, the position adjustment value for each TP is also recorded together with the TP so as to be visible for a user. The vicinity of the TP means, at most, being next in the main scanning direction D1 or the sub scanning direction D2, and for example, −2α which is the position adjustment value for the TP 40*a* is recorded at a position closest to the TP 40*a* among the TPs 40*a*, 40*e*, 40*d*, 40*c* and 40*b*.

In step S110, the adjustment value calculating unit 12*b* of the control unit 11 acquires read data of the TP group 43. That is, the reading device 1 reads the medium 30 on which the TP group 43 is recorded and outputs the read data as a reading result to the recording device 10. Accordingly, the control unit 11 can acquire the read data of the TP group 43.

In step S120, the adjustment value calculating unit 12*b* acquires stripe density for each of the TPs 40*a*, 40*b*, 40*c*, 40*d* and 40*e* from the read date of the TP group 43 and calculates an approximate straight line F3 of the stripe density. Then, in step S130, the adjustment value calculating unit 12*b* acquires and stores a position adjustment value at which the approximate straight line F3 gives the stripe density D0 and ends the flowchart of FIG. 5.

In a lower stage in FIG. 6, the stripe density for each of the TPs 40*a*, 40*b*, 40*c*, 40*d* and 40*e* of the TP group 43 is indicated by plotting with a black circle so as to correspond to an order of the position adjustment values −2α, −α, 0, +α and +2α, and the approximate straight line F3 calculated from the stripe density by the least-square method is shown. Here, as described with reference to FIG. 4, each stripe density indicated by the black circle in the lower stage in FIG. 6 is density obtained from the read data of the TP group 43 when skew of the medium 30 occurs in paper feeding between a pass for recording the first patch 41 and a pass for recording the second patch 42. Note that stripe density for each of the TPs 40*a*, 40*b*, 40*c*, 40*d* and 40*e* obtained from the read date of the TP group 43 when skew of the medium 30 does not occur in the paper feeding between the pass for recording the first patch 41 and the pass for recording the second patch 42 is the same as the stripe density for each of the TPs 40*a*, 40*b*, 40*c*, 40*d* and 40*e* shown in the lower stage in FIG. 3.

In the lower stage in FIG. 6, for reference, the stripe density for each of the TPs 40*a*, 40*b*, 40*c*, 40*d* and 40*e* obtained from the read datum of the TP group 43 when the skew does not occur is indicated by a white circle. Hereinafter, for convenience, the stripe density indicated by the black circle in the lower stage in FIG. 6 is referred to as "stripe density with skew", and the stripe density indicated by the white circle in the lower stage in FIG. 6 is referred to as "stripe density without skew". Further, black arrows indicated in the lower stage in FIG. 6 are vectors a, b, c and e each indicating an amount and a direction of a change from stripe density with skew to stripe density without skew due to influence of skew.

First, attention is paid to the TP 40*a* of the position adjustment value=−2α. The TP 40*a* is recorded on a leftmost side in the TP group 43. Therefore, when skew as indicated by a two dot chain line in FIG. 6 occurs, a distance between the first patch 41 and the second patch 42 is smaller than that when position adjustment is performed with the position adjustment value=−2α in a situation without skew, and stripe density with skew becomes higher than stripe density without skew as indicated by the vector α. That is, darkness increases.

Next, when attention is paid to the TP 40*b* of the position adjustment value=−α, the TP 40*b* is recorded on a rightmost side in the TP group 43. Therefore, when the skew as indicated by the two dot chain line in FIG. 6 occurs, a distance between the first patch 41 and the second patch 42 is larger than that when position adjustment is performed with the position adjustment value=−α in the situation without skew, and stripe density with skew becomes lower than stripe density without skew as indicated by the vector b. That is, brightness increases.

Similarly, when attention is paid to the TP 40*c* of the position adjustment value=0, the TP 40*c* is recorded at a second position from right in the TP group 43. Therefore, when the skew as indicated by the two dot chain line in FIG. 6 occurs, a distance between the first patch 41 and the second patch 42 is larger than that of a case of the position adjustment value=0 in the situation without skew. Therefore, although not as much as an amount of the change from the stripe density without skew to the stripe density with skew of the TP 40*b* recorded on the rightmost side, stripe density with skew of the TP 40*c* also decreases to be lower than stripe density without skew as indicated by the vector c. That is, brightness increases.

Similarly, when attention is paid to the TP 40*d* of the position adjustment value=+α, the TP 40*d* is recorded at a center of the TP group 43. Therefore, even when the skew as indicated by the two dot chain line in FIG. 6 occurs, influence of the skew is substantially not received, or the influence of the skew is smallest as compared with the other TPs 40*a*, 40*b*, 40*c* and 40*e*. Thus, stripe density with skew of the TP 40*d* is the same or substantially the same as stripe density without skew. In the lower stage in FIG. 6, a white circle of the stripe density without skew corresponding to the position adjustment value=+α overlaps a black circle of the stripe density with skew corresponding to the position adjustment value=+α, and thus a description thereof is omitted.

Similarly, when attention is paid to the TP 40*e* of the position adjustment value=+2α, the TP 40*e* is recorded at a second position from left in the TP group 43. Therefore, when the skew as indicated by the two dot chain line in FIG. 6 occurs, a distance between the first patch 41 and the second patch 42 is smaller than that when the position adjustment value=+2α in the situation without skew. Therefore, although not as much as an amount of the change from the stripe density without skew to the stripe density with skew of the TP 40*a* recorded on the leftmost side, stripe density with skew of the TP 40*e* also increases to be higher than stripe density without skew as indicated by the vector e. That is, darkness increases.

According to such a result, among the vectors a, b, c and e indicated in the lower stage in FIG. 6, vectors at relatively close positions in the graph cancel each other. That is, when the stripe density with skew is observed for each TP of the TP group 43, the stripe density with skew has a value different from that of the stripe density without skew, however, due to the random order alignment of the TPs in the TP group 43, the change from the stripe density without skew to the stripe density with skew is canceled between the vectors a and b and canceled between the vectors c and e. Therefore, the approximate straight line F1 calculated from the stripe density without skew for each TP as shown in FIG. 3 and the approximate straight line F3 calculated from the stripe density with skew for each TP as shown in FIG. 6 substantially coincide with each other. According to such a present embodiment, substantially the same position adjustment value can be obtained in step S130 regardless of whether skew does or does not occur in the medium 30. That is, based on the recording result of the TP group 43, an appropriate position adjustment value from which the influence of the skew is removed can be acquired.

The effect of the random order alignment of the TPs in the TP group 43 of FIG. 6 will be verified in more detail. The approximate straight line described thus far can be expressed by a linear function Y=pX+q, where X is a position adjustment value on a horizontal axis and Y is stripe density on a vertical axis. P is a regression coefficient and q is an intercept. The regression coefficient p is expressed as a covariance of X and Y/a variance of X. Since the denominator "variance of X" is irrelevant to presence or absence of skew in the medium 30, attention is paid to the numerator "covariance of X and Y".

The covariance of X and Y is an averaged (Ave) of (a deviation of X×a deviation of Y), thus is represented by the following Expression (1).

$$\text{The covariance of } X \text{ and } Y=\{(X_i-X_{Ave})(Y_i-Y_{Ave})+(X_2-X_{Ave})(Y_2-Y_{Ave})+(X_3-X_{Ave})(Y_3-Y_{Ave})+(X_4-X_{Ave})(Y_4-Y_{Ave})+(X_5-X_{Ave})(Y_5-Y_{Ave})\}/5 \quad (1)$$

$X_1$ to $X_5$ are position adjustment values for the respective TPs 40*a*, 40*b*, 40*c*, 40*d* and 40*e* and are at equal intervals, thus $X_2$ to $X_5$ are defined as follows with $X_1$ as a reference.

$$X_2=X_1+8$$

$$X_3=X_1+16$$

$$X_4=X_1+24$$

$$X_5=X_1+32$$

Thus, Expression (1) can be represented by the following Expression (2). $Y_1$ to $Y_5$ are stripe density of the respective TPs 40*a*, 40*b*, 40*c*, 40*d* and 40*e*.

$$\text{The covariance of } X \text{ and } Y=\{X_1(Y_1+Y_2+Y_3+Y_4+Y_5)-X_{Ave}(Y_1+Y_2+Y_3+Y_4+Y_5)-5X_1Y_{Ave}+5X_{Ave}Y_{Ave}-80Y_{Ave}+8(Y_2+2Y_3+3Y_4+4Y_5)\}/5 \quad (2)$$

When $Y_1$ to $Y_5$ to which stripe density errors $\varepsilon_1$ to $\varepsilon_5$ due to the skew are added are defined as to $Y_1'$ to $Y_5'$, respectively, $Y_1'$ to $Y_5'$ are as follows according to the random order alignment.

$$Y_1'=Y_1+\varepsilon_1$$

$$Y_2'=Y_2+\varepsilon_5$$

$$Y_3'=Y_3+\varepsilon_4$$

$$Y_4'=Y_4+\varepsilon_3$$

$$Y_5'=Y_5+\varepsilon_2$$

Numbers 1 to 5 relating to the errors $\varepsilon_1$ to $\varepsilon_5$ are not numbers in the order of the TPs 40*a*, 40*b*, 40*c*, 40*d* and 40*e* such as numbers 1 to 5 relating to $X_1$ to $X_5$ and $Y_1$ to $Y_5$, but are numbers corresponding to a positional order of the TPs in the main scanning direction D1. For example, since the TP 40*b* is recorded at a rightmost position, that is, a fifth position from left, the error $\varepsilon_5$ is added to the stripe density $Y_2$ of the TP 40*b*.

In addition, assuming that positive and negative of the errors $\varepsilon_1$ to $\varepsilon_5$ are reversed from left to right with reference to $\varepsilon_3=0$ at a center and are proportional to a distance from the center, the errors are represented as follows.

$$\varepsilon_1=-2\varepsilon$$

$$\varepsilon_2=-\varepsilon$$

$$\varepsilon_3=0$$

$$\varepsilon_4=\varepsilon$$

$$\varepsilon_5=2\varepsilon$$

Under these definitions, $Y_1'$, $Y_2'$, $Y_3'$, $Y_4'$ and $Y_5'$ are substituted for $Y_1$, $Y_2$, $Y_3$, $Y_4$ and $Y_5$ in Expression (2). The average $X_{Ave}$ of X and the average $Y_{Ave}$ of Y do not change regardless of the presence or absence of skew. As a result of the substitution, all error components ε are eliminated in the term $8(Y_2+2Y_3+3Y_4+4Y_5)$, and all the error components ε are also eliminated in each term including the term $(Y_1+Y_2+Y_3+Y_4+Y_5)$. In other words, it can be said that the regression coefficient p does not change regardless of the presence or absence the stripe density errors due to the skew. Since the intercept q is $Y_{Ave}-pX_{Ave}$, when the regression coefficient p does not change, the intercept q also does not change. Therefore, according to the recording of the TP group 43 adopting the random order alignment of the present embodiment, the same approximate straight line can be calculated from read data regardless of whether or not skew occurs in the medium 30 during paper feeding, and an appropriate position adjustment value from which influence of skew is removed is obtained.

Needless to say, the random order alignment of the TPs in the TP group 43 may be reverse to the order illustrated in FIG. 6, that is, the TPs 40*b*, 40*c*, 40*d*, 40*e* and 40*a* from left to right. In addition, with respect to the TP group 40 in the related art, for example, the positions of the TP 40*b* and the TP 40*e* may be replaced with each other to form a random order alignment of the TP 40*a*, 40*e*, 40*c*, 40*d* and 40*b*, or the positions of the TP 40*c* and the TP 40*d* may be replaced with each other to form a random order alignment of the TPs 40*a*, 40*b*, 40*d*, 40*c* and 40*e*. In addition, with respect to the TP group 40 in the related art, there are various ways of aligning the TPs 40*a*, 40*b*, 40*c*, 40*d* and 40*e* in a random order in the main scanning direction D1. In any case, by adopting a random order alignment in recording of a plurality of TPs, when compared with the TP group 40, an effect of suppressing a change of an approximate straight line due to influence of skew by the above-described cancellation occurs, and it is possible to acquire a position adjustment value in which the influence of the skew is reduced.

4. Modification

As described above, the control unit 11 controls the recording head 19 to record, on the medium 30, TPs from which a shift amount between different passes is acquirable. The shift amount may be a shift amount in the main scanning direction D1, in addition to the shift amount in the transport direction D2 as described above. A shift in the main scanning direction D1 between different passes is a shift between recording by a forward pass and recording by a backward pass, that is, a shift in bi-directional recording. Therefore, in the present modification, the bidirectional recording is assumed.

Figure 8A:
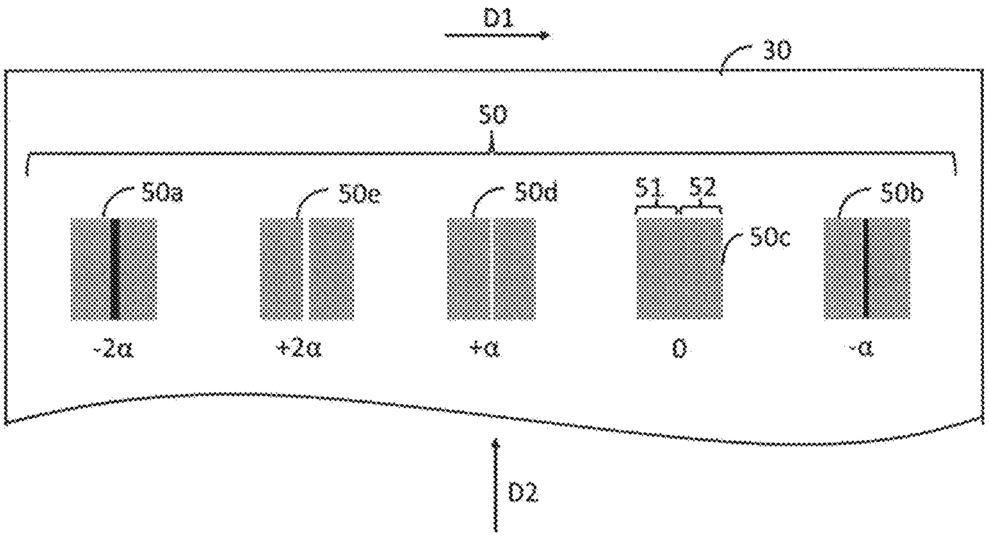
FIGS. 8A and 8B are each a diagram illustrating a part of a medium on which a TP group according to a modification is recorded.

FIG. 8A illustrates a part of the medium 30 on which the TP recording control unit 12*a* controls the recording head 19 to record a TP group 50 in step S100. The TP group 50 includes n TPs 50*a*, 50*b*, 50*c*, 50*d* and 50*e*. According to the TP group 50, the TPs 50*a*, 50*b*, 50*c*, 50*d* and 50*e* are recorded side by side from left to right along the main scanning direction D1 in an order of the TPs 50*a*, 50*e*, 50*d*, 50*c* and 50*b*. Each of the TPs 50*a*, 50*b*, 50*c*, 50*d* and 50*e* is formed by a right first patch 51 and a left second patch 52. In FIG. 8A, description of reference numerals 51 and 52 is omitted for the TPs 50*a*, 50*b*, and 50*e* other than the TP 50*c*.

The plurality of patches 51 and 52 forming one TP are recorded by different passes, respectively. That is, the first patch 51 is recorded by a forward pass of the recording head 19, and the second patch 52 is recorded by a backward pass of the recording head 19. Further, the TPs 50*a*, 50*b*, 50*c*, 50*d* and 50*e* are formed so as to be different from each other in positional relationship of the first patch 51 and the second patch 52. −2α, −α, 0, +α, and +2α illustrated in FIG. 8A are position adjustment values for the first patch 51 and the second patch 52 related to the TPs 50*a*, 50*b*, 50*c*, 50*d* and 50*e*, respectively. α is a numerical value indicating a predetermined distance or a predetermined time.

For example, when a position adjustment value is positive, timing at which the second patch 52 next to the first patch 51 recorded by a forward pass is recorded by a backward pass is advanced according to a numerical value such as α or 2α, as compared with a case where the position adjustment value is 0. +2α indicates earlier timing than +α. Therefore, a TP having a positive position adjustment value is likely to be recorded at a position where the second patch 52 is away from the first patch 51. On the other hand, when the position adjustment value is negative, timing at which the second patch 52 next to the first patch 51 recorded by the forward pass is recorded by the backward pass is delayed according to a numerical value such as α or 2α, as compared with a case where the position adjustment value is 0. −2α indicates later timing than −α. Therefore, in a TP having a negative position adjustment value, the second patch 52 is likely to be recorded so as to overlap the first patch 51 to a greater extent.

That is, in the TP group 50, the n TPs 50*a*, 50*b*, 50*c*, 50*d* and 50*e* are recorded along the main scanning direction D1 in a random order alignment which is different from an "order of the TPs 50*a*, 50*b*, 50*c*, 50*d* and 50*e* for which the positional relationship of the patches 51 and 52 gradually changes". With respect to the TP group 50, a black line in an overlapping portion between the patches 51 and 52 illustrated in FIG. 8A and a white line in a gap are regarded as a black stripe and a white stripe, respectively. Then, as described above, in steps S110 to S130, it is sufficient that the control unit 11 acquires stripe density for each of the TPs 50*a*, 50*b*, 50*c*, 50*d* and 50*e* from read data of the TP group 50 and acquires a position adjustment value from a calculated approximate straight line. The position adjustment value mentioned here is a value for adjusting timing of recording by a backward pass with respect to recording in a forward pass.

In the recording device 10, when a distance between the recording head 19 and the medium 30 in a certain scan is different between one side and another side in the main scanning direction D1, that is, between a left side and a right side, due to various factors such as mechanical errors and vibrations of the device, a time required for a dot discharged from the recording head 19 to land on the medium 30 is different between the left side and the right side. For example, when external force such as vibration is applied to the recording device 10 and the distance between the recording head 19 and the medium 30 during recording is different between the left side and the right side, a black stripe is likely to occur in a position where the distance between the recording head 19 and the medium 30 is large, and a white stripe is likely to occur in a position where the distance is small. That is, when the time to land is long in a forward pass, a dot is shifted in a forward direction and lands, and conversely, when the time to land is short, the dot is shifted in a backward direction from an intended position and lands. When such a shift in the distance between the recording head 19 and the medium 30 is grasped in the same manner as the skew described above, a device is necessary for obtaining a position adjustment value from which influence of the shift is eliminated as much as possible. Therefore, from such a viewpoint, it can be said that it is beneficial to record the TP group 50 as illustrated in FIG. 8A in the present embodiment.

Figure 8B:
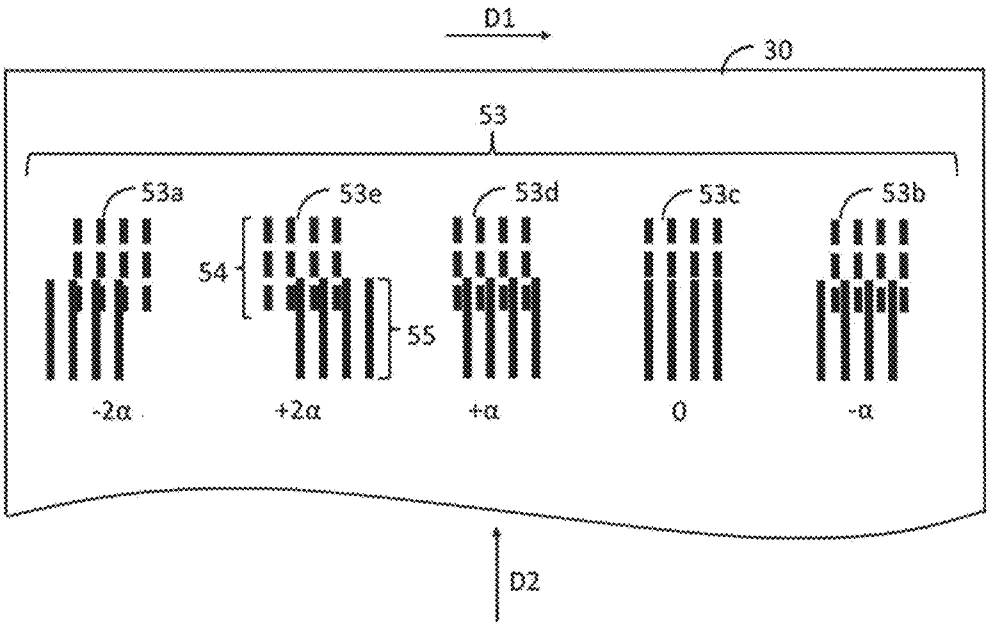

In the present modification, the example of the TP group to be recorded on the medium 30 is not limited to the TP group 50 illustrated in FIG. 8A, but may be a TP group 53 illustrated in FIG. 8B. FIG. 8B illustrates a part of the medium 30 on which the TP recording control unit 12*a* controls the recording head 19 to record the TP group 53 in step S100. The TP group 53 includes n TPs 53*a*, 53*b*, 53*c*, 53*d* and 53*e*. According to the TP group 53, the TPs 53*a*, 53*b*, 53*c*, 53*d* and 53*e* are recorded side by side from left to right along the main scanning direction D1 in an order of the TPs 53*a*, 53*e*, 53*d*, 53*c* and 53*b*. Each of the TPs 53*a*, 53*b*, 53*c*, 53*d* and 53*e* is formed by a first patch 54 and a second patch 55. In FIG. 8B, description of reference numerals 54 and 55 is omitted for the TPs 53*a*, 53*b*, 53*c* and 53*d* other than the TP 53*e*.

The first patch 54 is formed by aligning several ruled lines each having a length component in the sub scanning direction D2 in the main scanning direction D1. The second patch 55 is formed by aligning several ruled lines each having a length component in the sub scanning direction D2 in the main scanning direction D1. In FIG. 8B, for easy understanding, the ruled line of the first patch 54 is indicated by a chain line, and the ruled line of the second patch 55 is indicated by a solid line. The expression "patch" refers to, at most, an element constituting a TP or a group of such elements. Therefore, the first patch 54 and the second patch 55 may be referred to as a first pattern element 54, a second pattern element 55 or the like, or may be referred to as a ruled line group or the like.

As an interpretation of FIG. 8B, it is sufficient that the first patch 54 is regarded as an equivalent to the first patch 51 in FIG. 8A, and the second patch 55 is regarded as an equivalent to the first patch 52 in FIG. 8A. Position adjustment values for the respective TPs 53*a*, 53*b*, 53*c*, 53*d* and 53*e* such as $-2\alpha$, $-\alpha$, 0, $+\alpha$, and $+2\alpha$ in FIG. 8B are interpreted in the same manner as in FIG. 8A. Accordingly, in the TP group 53, the n TPs 53*a*, 53*b*, 53*c*, 53*d* and 53*e* are recorded along the main scanning direction D1 in a random order alignment which is different from an "order of the TPs 53*a*, 53*b*, 53*c*, 53*d* and 53*e* for which positional relationship of the patches 54 and 55 changes". Regarding the TP group 53, it is sufficient that a leftward shift amount of a ruled line of the second patch 55 with respect to a ruled line of the first patch 54 in the TP obtained from read data is regarded as an equivalent to the stripe density of the black stripe described above, and a rightward shift amount of the ruled line of the second patch 55 with respect to the ruled line of the first patch 54 in the TP is regarded as an equivalent to the stripe density of the white stripe described above.

5. Summary

As described above, according to the present embodiment, the recording device 10 includes the recording head 19 having the plurality of nozzles 20 for discharging liquid onto the medium 30 and the control unit 11 for controlling the recording head 19, and performs recording on the medium 30 by a scan for causing the recording head 19 to discharge the liquid while moving the recording head 19 along the predetermined main scanning direction D1. The control unit 11 controls the recording head 19 to record n TPs from which a shift amount is acquirable between a scan and a scan different from each other on the medium 30 in the main scanning direction D1, where n is the integer of 3 or more, one TP is formed by a plurality of patches recorded by a plurality of scans, the n TPs are formed so as to be different from each other in positional relationship of the plurality of patches and recorded side by side in an order different from an order in which the positional relationship of the plurality of patches gradually changes in the main scanning direction D1.

According to this configuration, the recording device 10 records the plurality of TPs in a random order alignment in the main scanning direction D1. Accordingly, even when an error such as skew in anything other than a shift of an adjustment target occurs between recording of a patch by a previous scan and recording of a patch by a subsequent scan, appropriate information in which influence of such an error is reduced can be acquired from recording results of the plurality of TPs.

In addition, according to the present embodiment, the shift amount is a shift amount in the transport direction D2 of the medium 30 intersecting the main scanning direction D1.

According to the above-described configuration, even when the skew occurs, the control unit 11 can acquire an appropriate adjustment value for eliminating a shift in transport obtained by reducing influence of such an error.

Additionally, according to the present embodiment, the control unit 11 may make positional relationship of a plurality of patches different for each TP, by making a range of the nozzles 20 used for recording the patch in the transport direction D2 different for each TP.

According to the above-described configuration, the control unit 11 can record the plurality of TPs aligned in the main scanning direction D1 with a minimum number of scans.

The recording device 10 includes the transport unit 17 that transports the medium 30 in the transport direction D2.

Then, the control unit 11 may make the positional relationship of the plurality of patches different for each TP, by making a distance of transport that the transport unit 17 performs between a scan and a scan each for recording a patch different for each TP.

According to the above-described configuration, the control unit 11 reliably records the plurality of TPs different from each other in positional relationship of the plurality of patches by actually making transport distance between a scan and a scan different for each TP.

Further, according to the present embodiment, the shift amount may be a shift amount in the main scanning direction D1. According to the above-described configuration, even when an error such as a shift in a distance between the recording head 19 and the medium 30 or the like occurs between recording of a patch by a previous scan and recording of a patch by a subsequent scan, the control unit 11 can acquire an appropriate adjustment value for eliminating a shift in bidirectional recording obtained by reducing influence of such an error. Note that "between recording of a patch by a previous scan and recording of a patch by a subsequent scan" means not only a temporal interval but also a distance interval between a recording result of a patch and a recording result of a patch on the medium 30.

In addition, according to the present embodiment, the control unit 11 controls the recording head 19 to record first patches respectively corresponding to n TPs by a first scan and to record second patches respectively corresponding to the n TPs by a second scan such that a position of the second patch with respect to the first patch is different for each second patch.

According to the above-described configuration, the control unit 11 can record at least the first patches of the respective TPs by one scan and can increase recording efficiency of the plurality of TPs.

In addition, according to the present embodiment, the plurality of patches forming the TP may be recorded with liquid of the same color.

According to the above-described configuration, it is possible to prevent various errors between nozzle groups or nozzle chips corresponding to different inks from affecting a recording result of the TP.

However, the present embodiment does not exclude a case where the plurality of patches forming the TP are recorded with different colors of ink.

In addition, according to the present embodiment, n TPs may be recorded at equal intervals in the main scanning direction D1.

In addition, according to the present embodiment, n TPs may be recorded in a bilaterally symmetrical arrangement with a center of the medium 30 in the main scanning direction D1 as an axis.

According to these configurations, influence of skew on recording of each TP can be changed proportionally according to a position of a TP in the main scanning direction D1. Therefore, when a reading result of each TP is evaluated or when an approximate straight line is calculated, the influence is easily canceled and removed.

Furthermore, according to the present embodiment, the control unit 11 may control the recording head 19 to record, in a vicinity of each of n TPs, information indicating positional relationship of a plurality of patches forming the TP.

According to the above-described configuration, in the medium 30 on which the TP is recorded, it is possible to inform a user of the positional relationship of the plurality of patches forming the TP in an easy-to-understand manner.

The present embodiment discloses not only a category such as the recording device 10 or a system but also various categories such as a method performed by a device or a system and the program 12 for causing a processor to execute the method.

For example, a recording method that performs recording on the medium 30 by a scan for causing the recording head 19 to discharge liquid while moving the recording head 19 having a plurality of the nozzles 20 that discharge the liquid onto the medium 30 along the predetermined main scanning direction D1 includes a recording control step for controlling the recording head 19 so as to record n TPs from which a shift amount between different scans is acquirable on the medium 30 in the main scanning direction D1, where n is an integer of 3 or more. Step S100 corresponds to the recording control step. According to the recording control step, one TP is formed by a plurality of patches recorded by a plurality of scans, and the n patterns are formed so as to be different from each other in positional relationship of the plurality of patches and are recorded side by side in an order different from an order in which the positional relationship of the plurality of patches gradually changes in the main scanning direction D1.

Needless to say, n is not limited to 5. N may be 3, 4 or 6 or more. Also, there may be more than two patches that form one TP.

What is claimed is:

1. A recording device including a recording head including a plurality of nozzles for discharging liquid onto a medium and a control unit for controlling the recording head, and the recording device being configured to perform recording on the medium by a scan for causing the recording head to discharge the liquid while moving the recording head along a predetermined main scanning direction, wherein the control unit controls the recording head to record n test patterns, from which a shift amount between the scan and the scan different from each other is acquirable, on the medium in the main scanning direction, where n is an integer of 3 or more, at least three of the test patterns is formed by a plurality of patches recorded by a plurality of the scans, and the n test patterns are formed so as to be different from each other in positional relationship of the plurality of patches and recorded side by side in the main scanning direction in an order different from an order in which the positional relationship of the plurality of patches gradually changes.

2. The recording device according to claim 1, wherein the shift amount is a shift amount in a transport direction of the medium intersecting the main scanning direction.

3. The recording device according to claim 2, wherein the control unit changes the positional relationship of the plurality of patches for each test pattern by changing a range of the nozzle used for recording the patch in the transport direction for each test pattern.

4. The recording device according to claim 2, comprising a transport unit configured to transport the medium in the transport direction, wherein the control unit changes the positional relationship of the plurality of patches for each test pattern by changing a distance of the transport that the transport unit performs between the scan and the scan each for recording the patch for each test pattern.

5. The recording device according to claim 1, wherein the shift amount is a shift amount in the main scanning direction.

6. The recording device according to claim 1, wherein the control unit controls the recording head to record a first patches corresponding to each of the n test patterns by a first scans, and to record a second patches corresponding to each of the n test patterns by a second scans such that a position of the second patch with respect to the first patch is different for each second patch.

7. The recording device according to claim 1, wherein a plurality of the patches forming the test pattern are recorded with liquid of the same color.

8. The recording device according to claim 1, wherein the n test patterns are recorded at equal intervals in the main scanning direction.

9. The recording device according to claim 1, wherein the n test patterns are recorded in a bilaterally symmetrical arrangement with a center of the medium in the main scanning direction as an axis.

10. The recording device according to claim 1, wherein the control unit controls the recording head to record information indicating positional relationship of a plurality of patches forming the test pattern in a vicinity of each of the n test patterns.

11. The recording device according to claim 1, wherein each of the at least three of the test patterns includes, among the plurality of patches, a first patch and a second patch that is recorded after the first patch and recorded in a transport direction of the medium with respect to the first patch, the transport direction intersecting the main scanning direction, a first distance in the transport direction between the first patch and the second patch of a first test pattern among the at least three of the test patterns, a second distance in the transport direction between the first patch and the second patch of a second test pattern among the at least three of the test patterns, and a third distance in the transport direction between the first patch and the second patch of a third test pattern among the at least three of the test patterns are different from each other, the first distance is less than the second distance, and the second distance is less than the third distance, and the first test pattern, the second test pattern, and the third test pattern are arranged in the main scanning direction in an order of the first test pattern, the third test pattern, and the second test pattern, or in an order of the second test pattern, the first test pattern, and the third test pattern.

12. A recording method of performing recording on a medium by a scan for causing a recording head to discharge liquid while moving, along a predetermined main scanning direction, the recording head, the recording head including a plurality of nozzles for discharging the liquid onto the medium, the recording method comprising a recording control step for controlling the recording head to record n test patterns from which a shift amount between the scan and the scan different from each other is acquirable on the medium in the main scanning direction, where n is an integer of 3 or more, wherein in the recording control step, at least three of the test patterns is formed by a plurality of patches recorded by a plurality of the scans, and the n test patterns are formed so as to be different from each other in positional relationship of the plurality of patches and recorded side by side in the main scanning direction in an order different from an order in which the positional relationship of the plurality of patches gradually changes.

* * * * *